Nov. 1, 1938.   N. C. SMART   2,135,153
ELECTRIC SYSTEM OF CONTROL FOR LIFTS
Filed Nov. 19, 1936   11 Sheets-Sheet 1

INVENTOR
Norman C. Smart
BY
ATTORNEY

Figure 1:
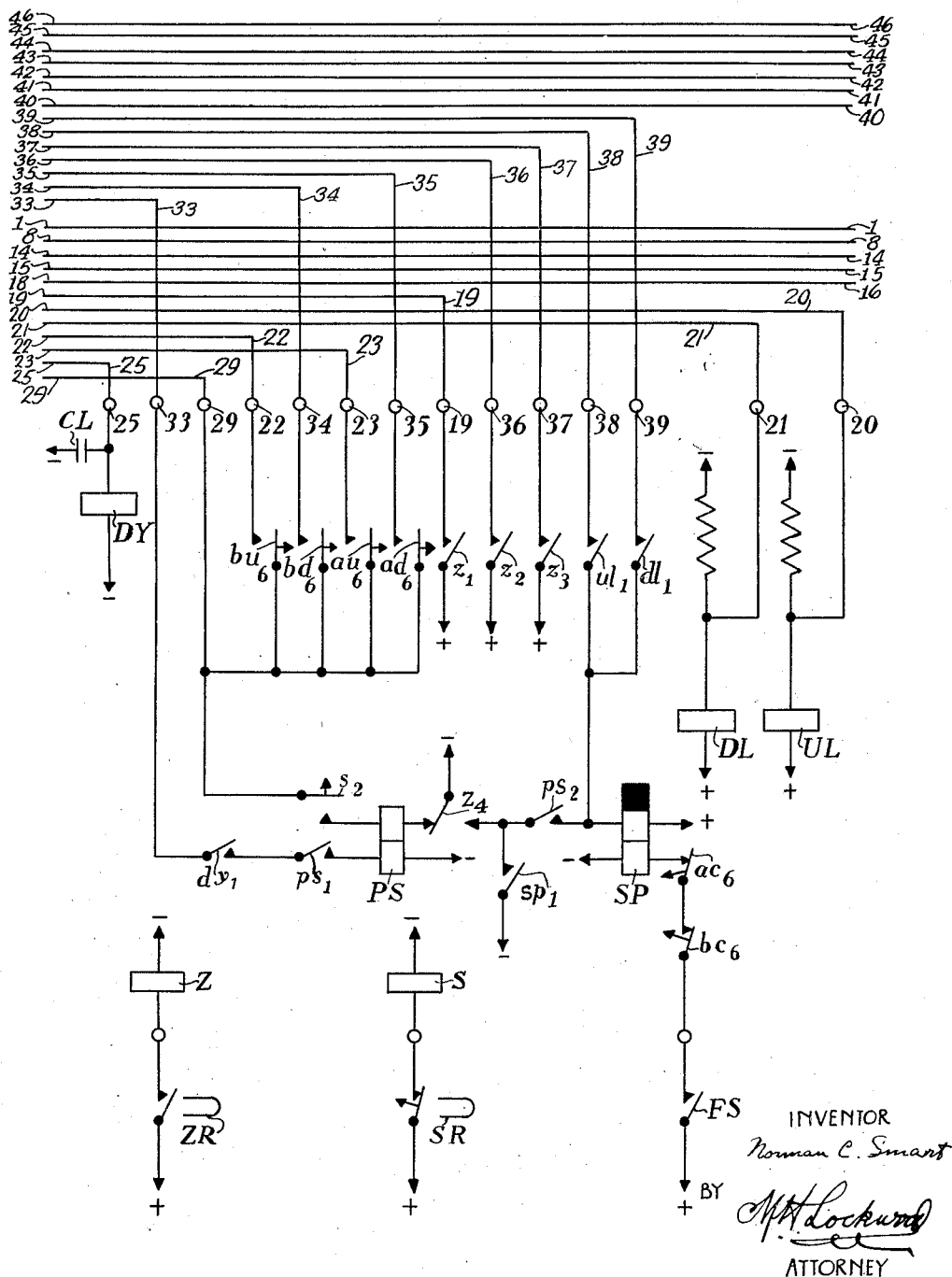

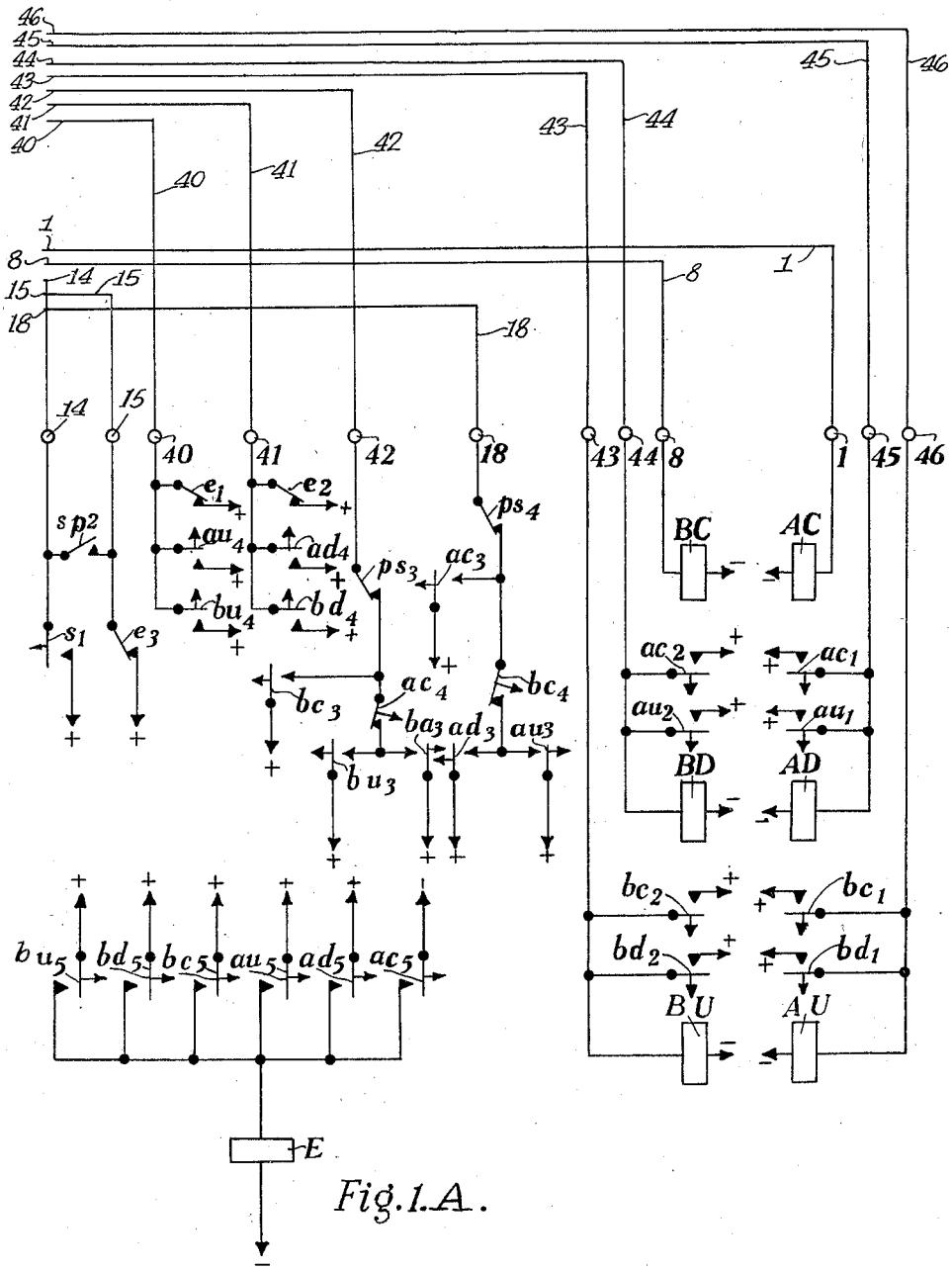
Fig.1.A.

Nov. 1, 1938.   N. C. SMART   2,135,153
ELECTRIC SYSTEM OF CONTROL FOR LIFTS
Filed Nov. 19, 1936   11 Sheets-Sheet 6
Fig. 3.A.
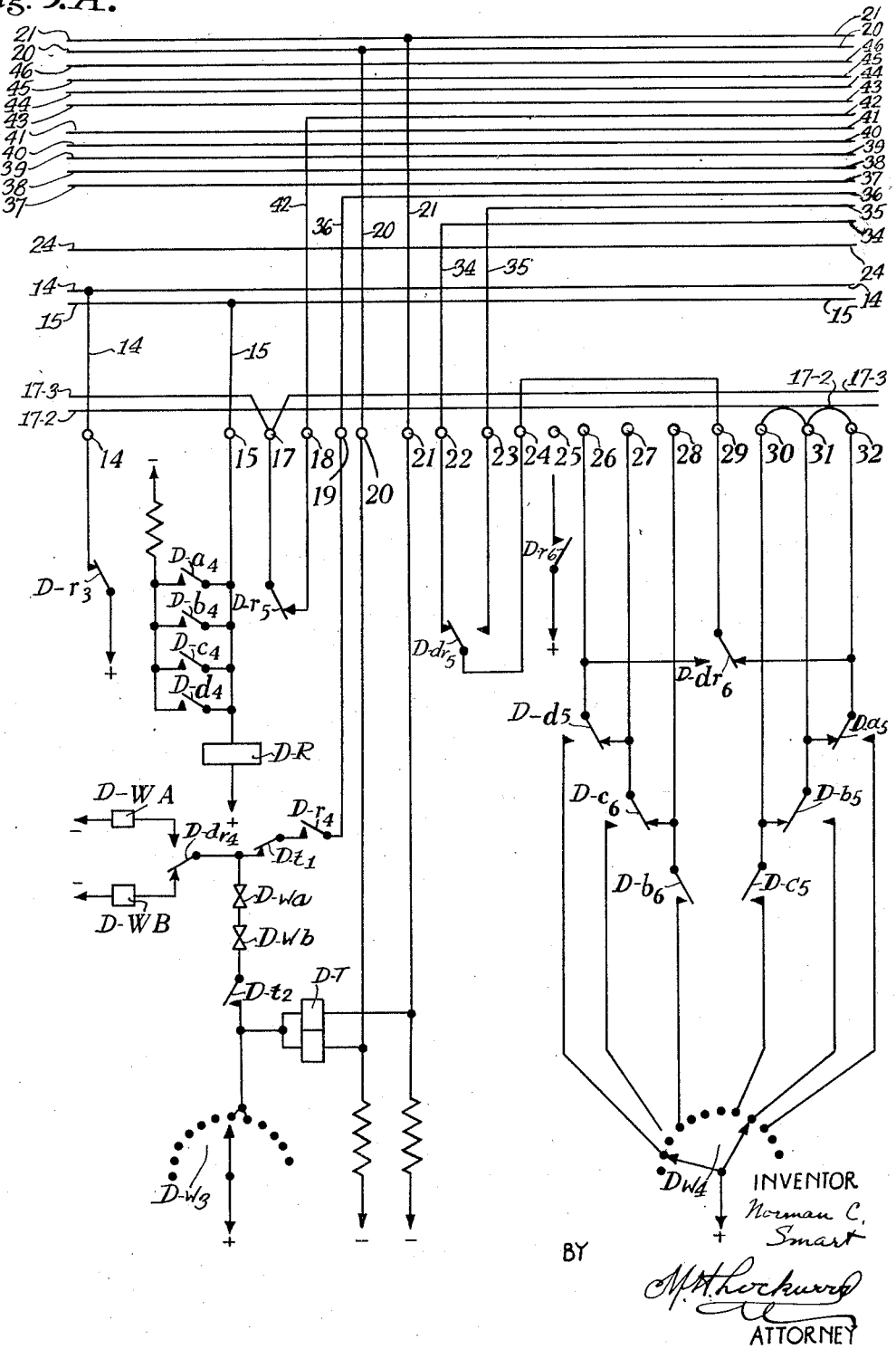
INVENTOR
Norman C. Smart
BY
M. H. Lockurry
ATTORNEY

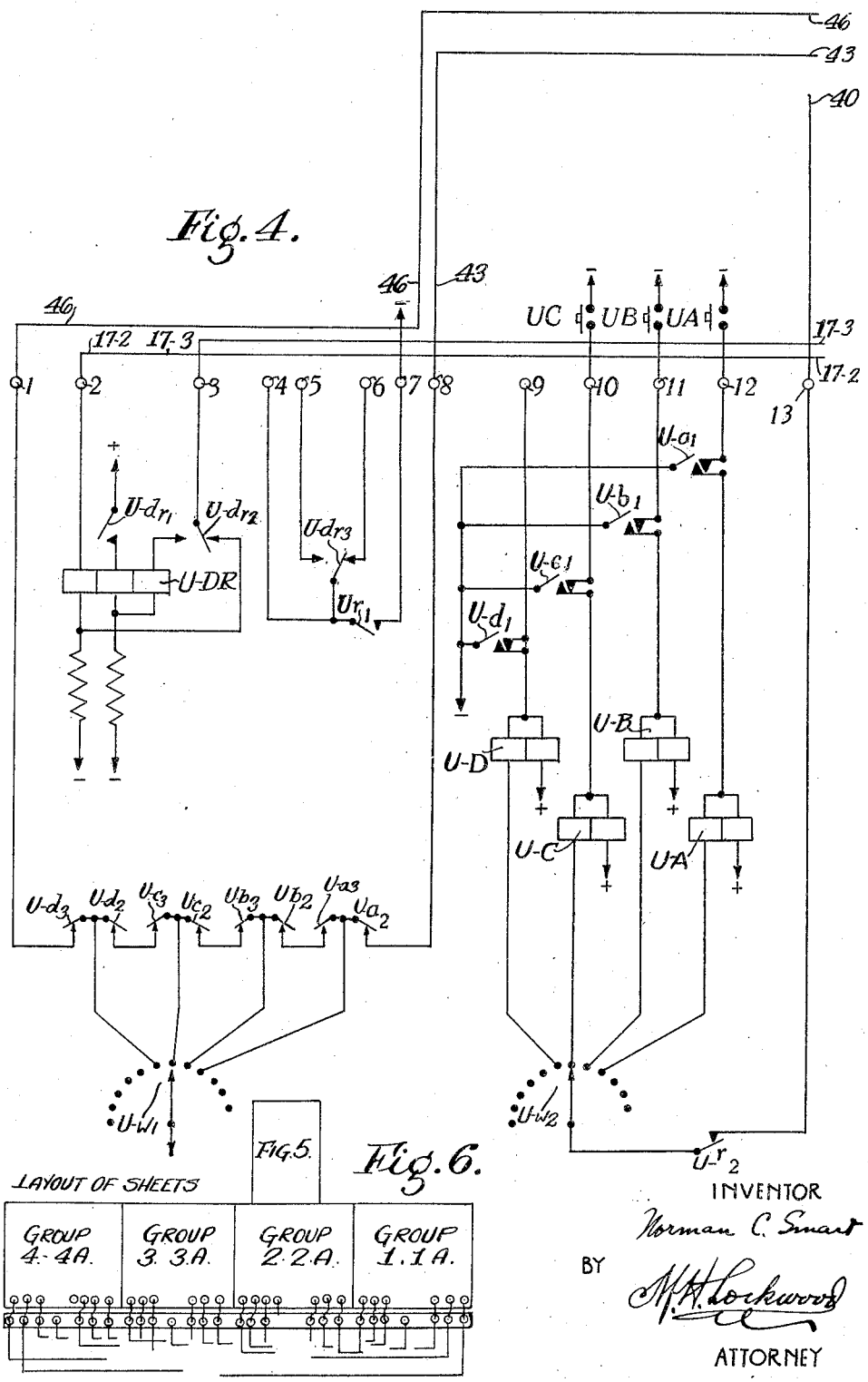

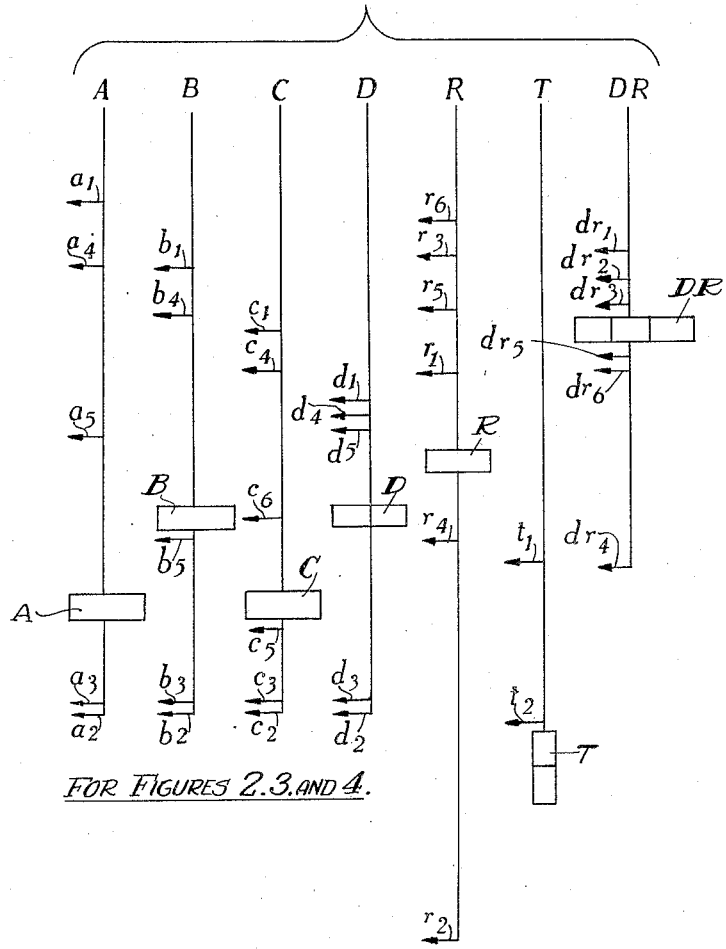

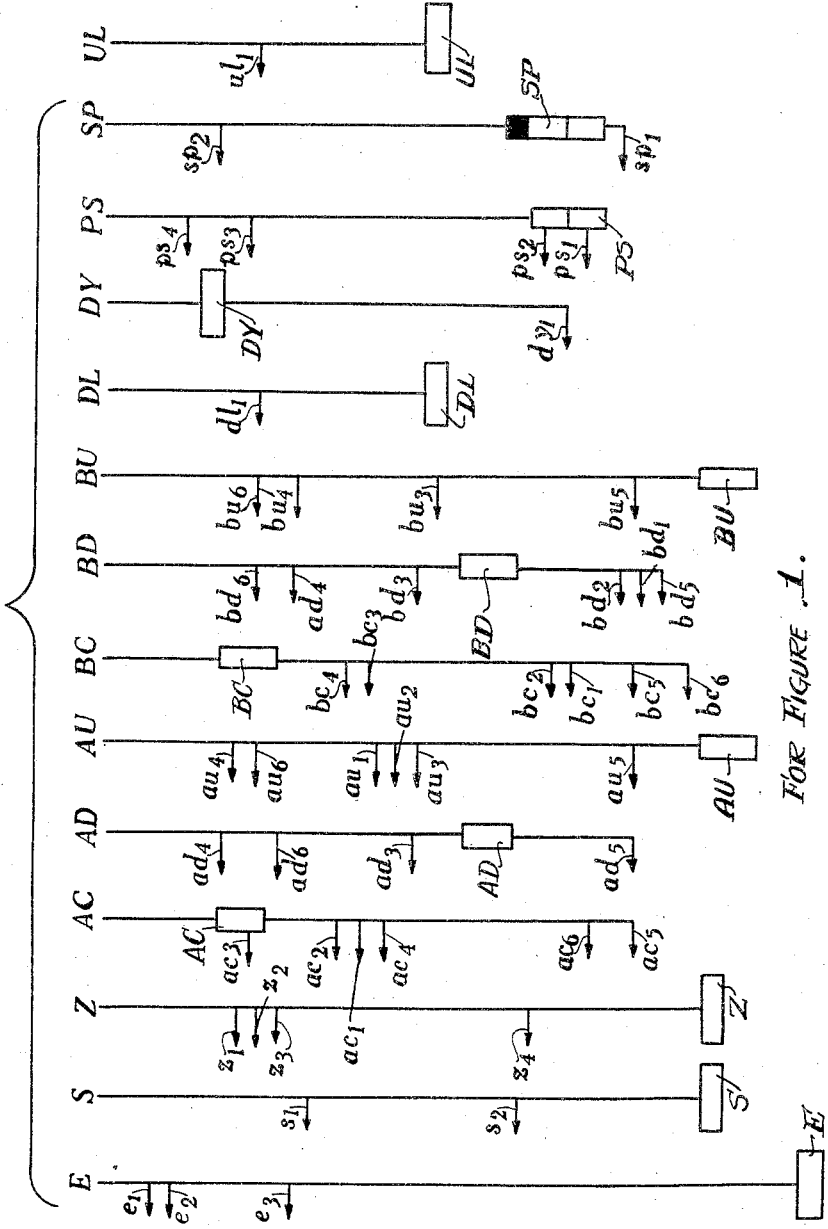

Patented Nov. 1, 1938

2,135,153

UNITED STATES PATENT OFFICE 2,135,153

ELECTRIC SYSTEM OF CONTROL FOR LIFTS

Norman Carol Smart, Binley, Coventry, England, assignor to The General Electric Company Limited, London, England Application November 19, 1936, Serial No. 111,652
In Great Britain November 7, 1935

12 Claims. (Cl. 187—29)

This invention relates to electric systems of control for lifts and has for its object the provision of improved facilities for lifts employing standardized control apparatus.

In the specification accompanying British patent appln. No. 19919/35 is disclosed the elements of a control group of apparatus for a lift, the said group being adapted to control all the normal actions of the lift i. e. starting, stopping, direction, call storage, call cancelling and the like. The apparatus group referred to is adapted to cater, as it stands, for a particular maximum of floors and for a particular type controlling system, these functions being determined principally by the quantity of apparatus included in the group. The control group is, however, intended to be a standard item available for use on all kinds of electrically controlled lifts, so that it is necessary to provide means whereby it may be used to control lifts having more extensive functions than those described in the application mentioned above.

A type of system which this apparatus group is adapted to control is that known as the collector. This system is well known, and exists in two forms, the single button and two button collector systems. The use of the present apparatus group for the control of a single button collector lift has already been described in the specification referred to previously, and the present invention is concerned with the application of the apparatus group to the control of a two button type collector lift.

In this type of lift each floor is provided with two buttons, one marked "up", the other "down". A passenger at a floor presses a button corresponding to the direction in which he wishes to travel, whereupon the lift stops at that floor to take him up only when travelling in a suitable direction, or when no other calls exist. The collector type lift has other subsidiary functions, but its aim is to make the best use of a lift by conveying the greatest number of passengers in the shortest time.

According to the present invention, a plurality of similar groups of apparatus each comprising means for call storage, means for following the motion of the lift in the shaft and means for signalling to a group of co-ordinating apparatus are employed to control a two button collector type lift, by means of interconnecting devices provided for each group.

A feature of the present invention consists in the mounting of each apparatus group on a single mounting plate, each group being provided with a plurality of terminals whereby each plate is interchangeable with each other since the said terminals co-operate with contact-making jacks on the rack on which plates are mounted, all changes of connections necessary to enable the apparatus groups to perform their correct functions being made on the connecting jacks.

It is arranged that calls are divided into three types, car, up-landing and down-landing. Each of these types of call is stored in a particular apparatus group, three such groups being provided, in addition to a co-ordinating group and the lift driving apparatus proper, the latter consisting of the driving motor, contactors, acceleration and deceleration controlling devices and the like.

Figure 2:
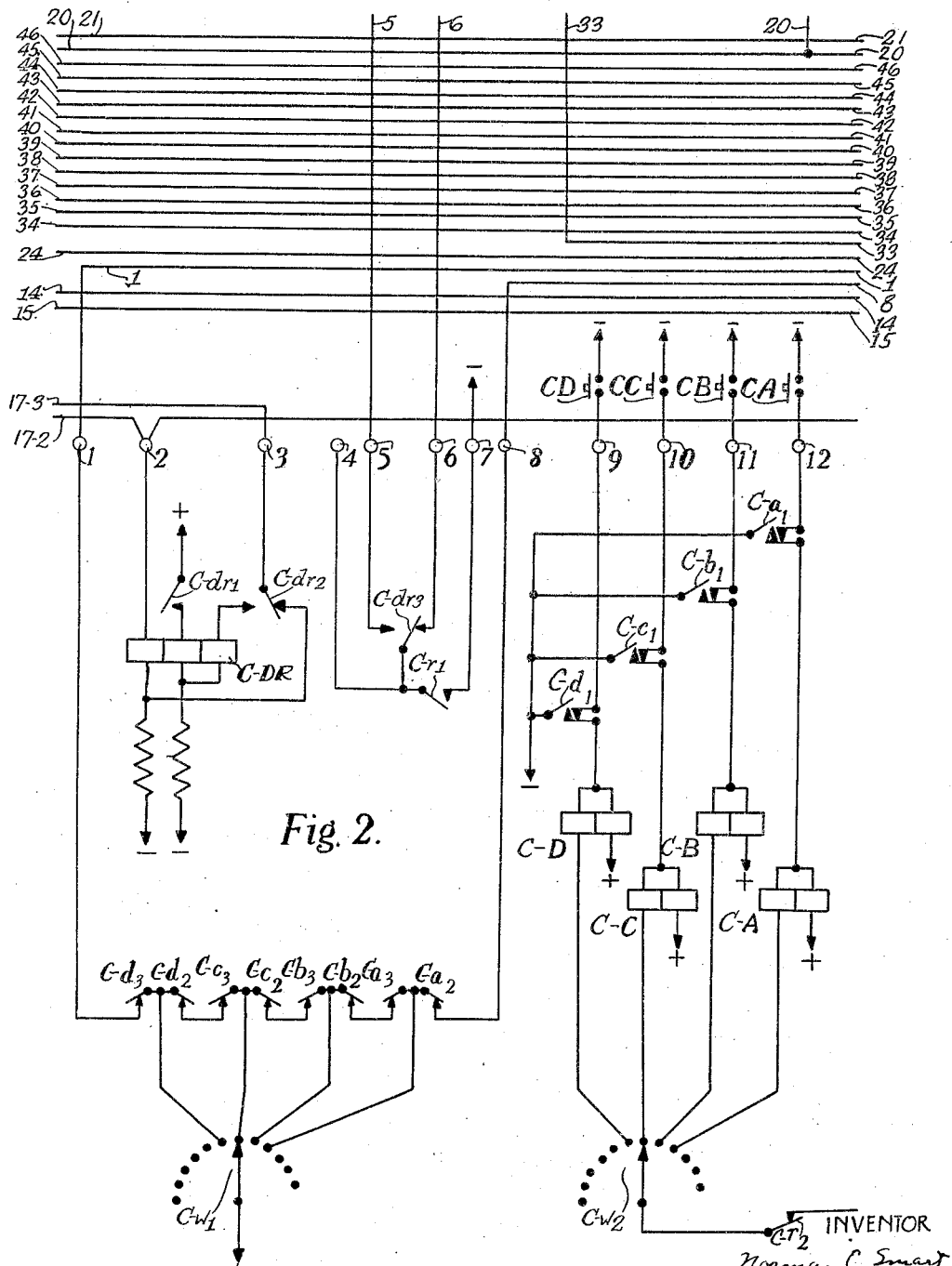
Figure 2A:
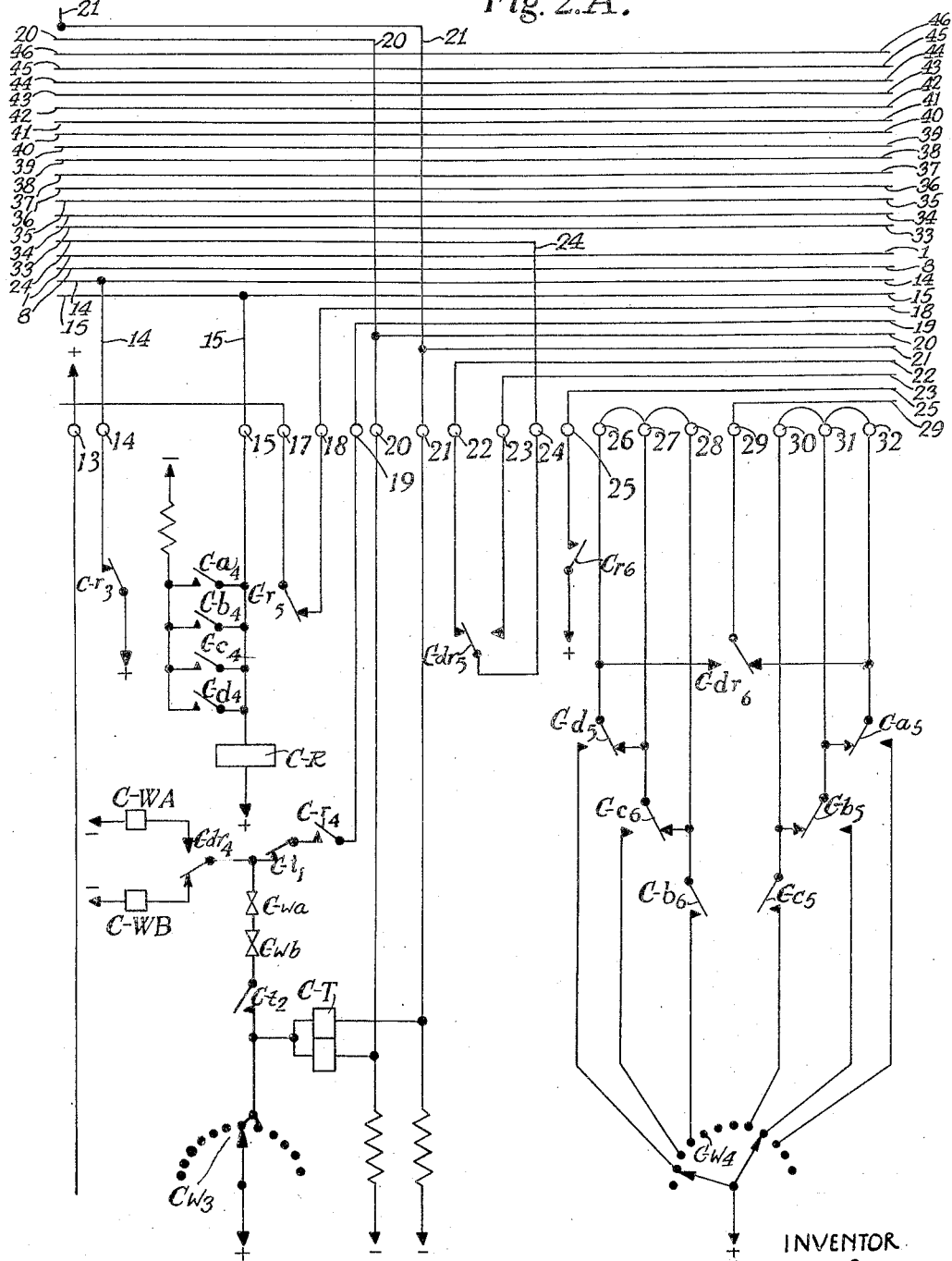
Figure 3:
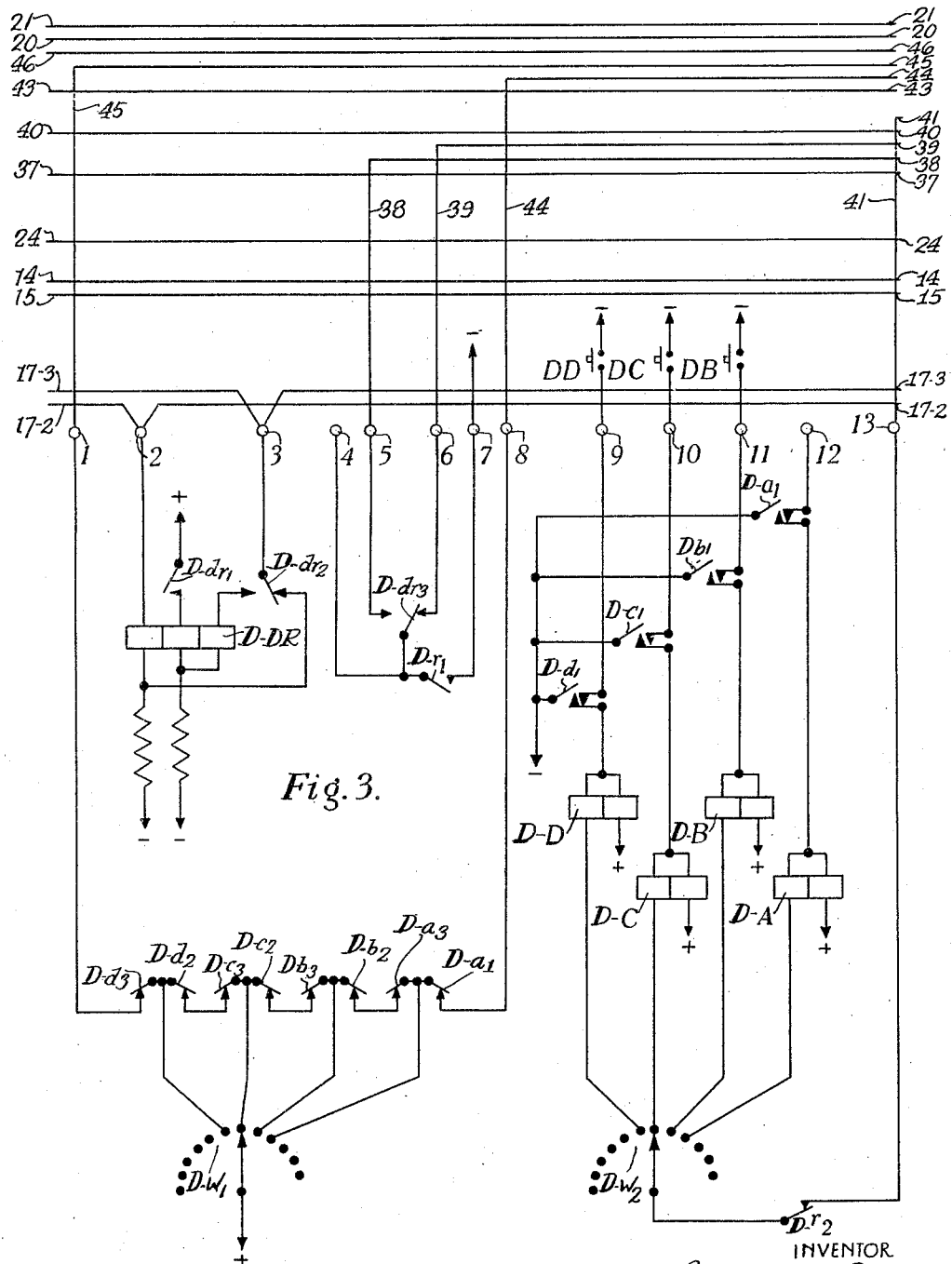
Figure 4A:
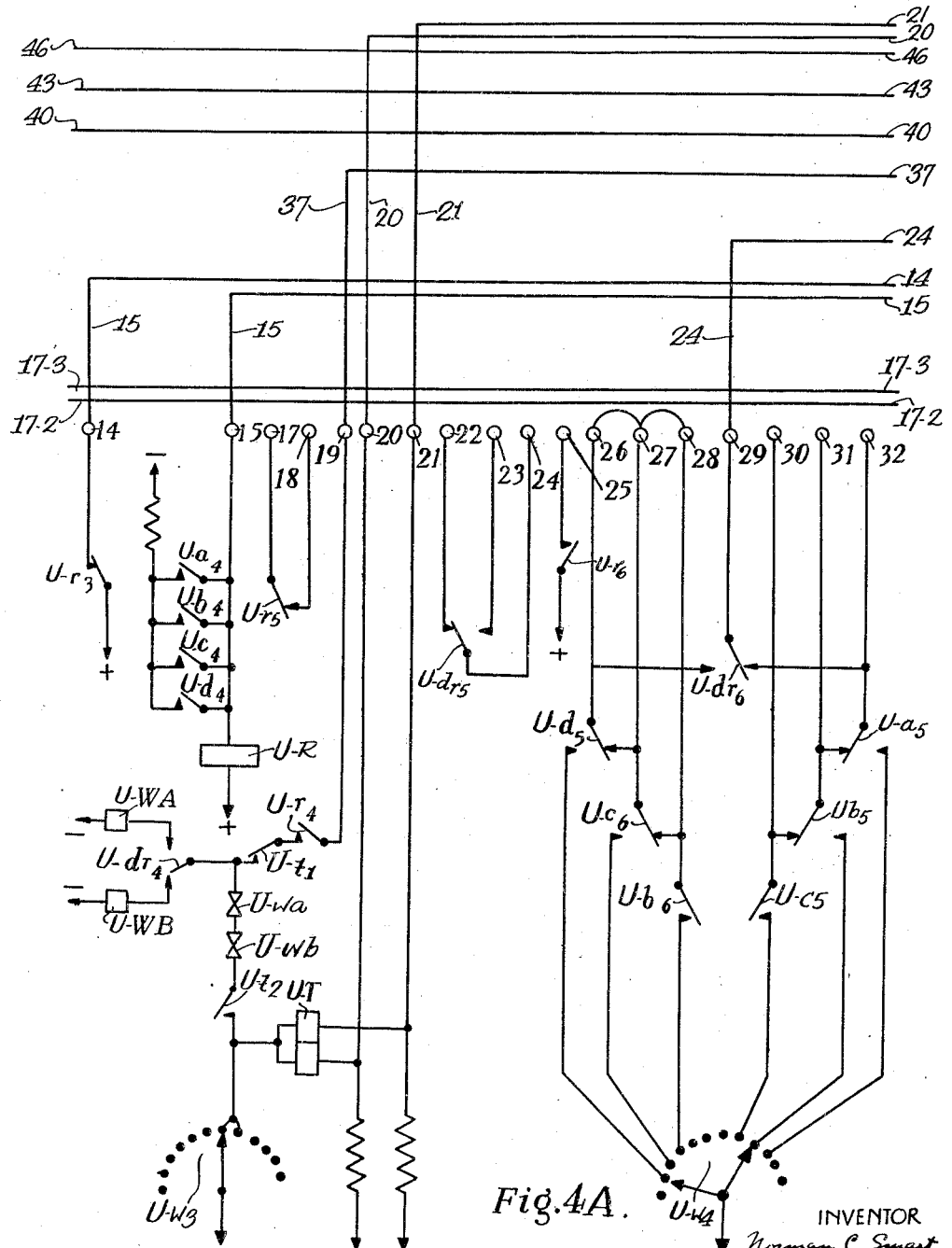
Figure 5:
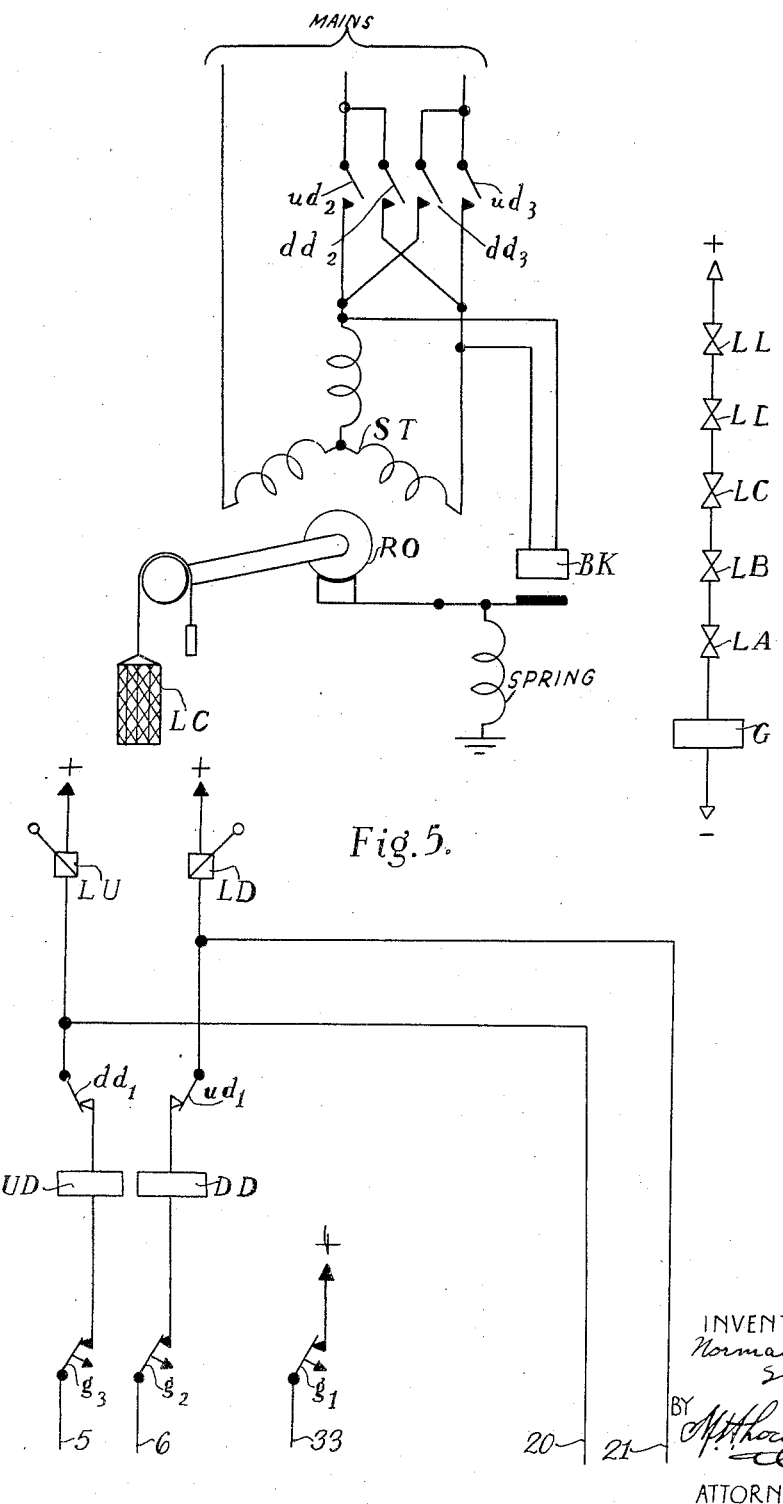

In order that the nature of the present invention may now be more particularly described and ascertained, reference should be made to the accompanying diagrammatic drawings in which Figures 1, 1A combined form the co-ordinating group, Figures 2, 2A combined form the apparatus group dealing with car calls, Figures 3, 3A combined show the apparatus which deals with down-landing calls, Figures 4, 4A combined show the apparatus which deals with up-landing calls and Figure 5 comprises the actual driving apparatus and contactors. To assist in understanding the drawings, it may be mentioned that the circuit below the terminals in each of Figures 3, 3A and 4, 4A is identical with that shown in Figures 2 and 2A, and the numbering of the terminals is also the same. The drawings should be positioned as shown in Figure 6, whilst code sheets for the Figures 2 and 1 are respectively shown in Figures 7 and 8.

The functions of the apparatus shown are particularly complex, and cannot be described in a straight forward manner. The reasons for this will be apparent later, and depend on the conditions set out below, which are those normally employed in a collector type lift. These conditions are laid down with the aim of providing as rapid and economical service as possible.

1. The lift must travel each time to the farthest call "ahead" of it, i. e. in the direction of its travel, before it reverses.
2. No call must be lost i. e. cancelled without collecting the intending passenger, if still waiting.
3. The lift must not be unduly detained at a landing to which it has been called, if no passengers enter or leave.
4. Car calls must have a first order of priority, landing calls in the direction in which the lift is travelling must have a second order of priority, and calls necessitating opposite direction of travel must have third order of priority.
5. The lift must not stop or reverse except at a floor.

There are a number of minor operating conditions in addition to the foregoing, but these will suffice for the time being. The other conditions will be obvious from the description.

Thus it will be seen that in the case of a lift having a number of calls for it, a very large number of different conditions may ensue. For example, the lift may be travelling upwards at the second floor, and have up calls at the fourth and fifth and a down call at the third floor. Again, it may be travelling downwards near the bottom of the shaft and have both up and down calls behind it. It is, therefore, impossible to describe the operation of the lift in response to each one of the conditions likely to be met in practice, so that it is proposed to deal, in the following description principally with the functions of the various apparatus units concerned and then describe a relatively small number of typical operating conditions.

Referring now to Figure 2 it will be seen to consist of a step-by-step switch C—W and a group of relays C—A to C—D. The switch C—W possesses banks C—W1 to C—W4, and up and down drive magnets C—WA and C—WB respectively. Bank C—W1 provides, in conjunction with a group of relay contacts C—$a_2$ to C—$d_3$, an indication to the co-ordinating group of the direction in which the lift is required to travel when a call appears. Bank C—W2 is employed to cancel calls from the relay group C—A to C—D, bank C—W3 is used to ensure that the switch is in exact synchrony with the lift at the top and bottom of the shaft and bank C—W4 is used in conjunction with the co-ordinating group to control the stopping of the lift.

As regards the relays, direction relay C—DR always stands in a position corresponding to that in which the lift is required to travel. It may be operated to one position for upward travel, and when the lift stops, remains so positioned. On reversal, the direction relay is moved to another position and remains so until the lift is once more reversed. Relays C—A to C—D are employed for call storage. Call buttons CA—CD are provided in the lift car, the circuit shown being suitable for a collector lift serving four floors. Each of these car push buttons operates one of the relays C—A to C—D, each relay locking up to a negative potential via its own contact C—$a_1$ to C—$d_1$. When a call represented by an operated relay is answered, the wiper C—W2 applies positive potential to another winding of the relay, the two acting in opposition causing the relay to release. Relay C—R operates to start the lift. It is so operated by one of the contacts C—$a_4$ to C—$d_4$ and on arrival near to a floor at which stoppage is required, the relay is short circuited by the co-ordinating group over terminal and lead 15, so that its contact C—$r_1$ may de-energize whichever of the driving contactors UD or DD is operated. If further calls exist for the lift, the short circuit is removed at the end of a suitable period and the lift is once more enabled to drive. Finally, relay C—T in conjunction with bank C—W3 is employed for synchronizing. The relay is operated by a limit switch LU or LD when the lift reaches either end of the shaft, and its contact C—$t_2$ causes the switch to take up a position corresponding to the lift, if it is not already there.

The bank C—W4 and the associated contacts C—$a_5$ to C—$d_5$ are for the purpose of indicating to the co-ordinating group when the lift should stop. In the case of car calls, the lift must stop for any one such call, so that if the lift is approaching a floor for which a car call has been made, then it must not pass this floor. This is because the passenger is supposed to have entered the lift only when the latter is travelling in a direction suitable for answering his call. Thus a difference exists between this type of call and one made from a landing in that if an "up" landing call has been made and the lift is travelling downwards towards this floor it should not stop at the floor for the purpose of picking up the passenger making the call though stoppage may take place for other reasons. These conditions are provided for by the bank and contacts shown, and by the inter-connection of terminals 26—32. The wiper C—W4 is bifid, each end co-operating with a different group of contacts. These contact groups control the lift's motion when travelling in opposite directions. The group C—$a_5$ to C—$c_5$ is used when the lift is travelling downwards and the other group when the lift is travelling in the opposite direction. The switch C—W is impulsed at each point midway between floors by means of a zone inductor relay, and being of a high speed type must, if full speed is reached, commence to slow down for a floor at a point one-and-a-half floors away. The circuit is shown as though the lift were positioned at the third floor (the ground floor being hereafter referred to as the first), so that if a call exists for the first floor, and relay C—A is operated, the lift travels downwards until it reaches a point one-and-a-half floors away, when the switch C—W is stepped in a clockwise direction and positive is applied from wiper C—W4 via contact C—$a_5$ (operated to right contact) and contact C—$dr_6$ over lead 29 to prepare the lift for stopping. A similar action takes place one-and-a-half floors "ahead" if the lift is travelling in an upward direction. If the lift calls at successive floors it accelerates for a short distance out of one floor and then commences to slow down for the next. Further details of the operation of the apparatus shown in this figure may be derived from the complete specification accompanying British patent appln. No. 19919/35.

Referring now to the co-ordinating group in Figure 1, this consists of a number of relays operated from the groups storing the various types of call, and it acts to co-ordinate these types for the purpose of intimating to the lift whether to stop or not, and controls call cancellation in the various storage groups. In the co-ordinating group a number of relays AC, BC, AD, BD, AU, BU are provided for the purpose of starting and stopping the lift, and operating the direction relays DR in the other apparatus groups. Each pair of relays, such as AC, BC, AU, BU is connected to the ends of the respective contact chains C—$a_2$ to C—$d_3$, U—$a_2$ to U—$d_3$ in one apparatus group. Taking the pair AC, BC, when no car calls exist, all the relay contacts C—$a_2$ to C—$d_3$ mentioned are closed. Thus wherever the position of the lift, a positive potential is derived from wiper C—W1, this potential being fed both ways along the contact chain to terminals 1 and 8. The potential on leads 1 and 8 holds both relays AC and BC operated, this condition being referred to hereafter as normal, and being indicated by an arrow on each of the relay contacts concerned, the arrow pointing in the direction in which the contact is normally held operated.

Similarly, relays AD and BD, representing "above-down" and "below-down" calls respectively are operated and released from the down landing apparatus group (Figure 3), and relays AU and BU representing "above-up"

and "below-up" calls are operated from the up landing apparatus group (Figure 4).

The connections of the relay contacts are such that when all these relays are operated the lift remains stationary in the position to which it has last been called. If a car call, for example, is made for a floor above the lift such for instance as that made at the third floor for the fourth floor, contacts $C-d_2$ and $C-d_3$ open in response to the operation of relay $C-D$, by push button CD, and positive is removed from lead and terminal 1 and hence from relay AC, which releases. This drives the lift in an upward direction to answer this particular call.

The foregoing condition i. e. the lift travelling upwards in response to a car call, must prevent the lift from stopping at floors where only calls for a downward direction exist. The relays indicating that such calls exist are AD and BD (Figure 1), release of which would cause the lift to stop at a floor to answer a call at which the lift would have to reverse. Even if such calls should now be made ahead of the lift, the relays AD and BD are prevented from releasing by contacts $ac_1$ and $ac_2$, which close and hold the said relays operated until the original call has been answered.

Similarly, if the lift is travelling downwards in response to a car call, relay BC is de-energized, and contacts $bc_1$ and $bc_2$, being closed, prevent relays AU and BU from releasing if any up-landing calls are stored, until the car call has been attended to.

In the conditions of operation, it was stated that a second order of priority existed. In this category are included calls made from landings ahead of the lift, and in the direction of travel. Calls of this nature should prevent reversal of the lift even though it is attending to a call which could not take it as far as the landing from which the said call is being made. Calls for an opposite direction of travel must, therefore, be ineffective to reverse the lift until it has travelled as far in its original direction as possible. Assume that the lift is travelling upwards and that landing calls exist above it for an upward direction. In this case, relay AU is released, because although the lift may be answering a car call, no contact of relay AC exists in relay AU's circuit. This relay AU has contacts $au_1$ and $au_2$ which hold operated relays BD and AD, either of these relays being operated if calls exist for the lift either below or above its position for a downward direction of travel. The lift is therefore prevented from answering any calls necessitating reversal until it has travelled to the farthest landing for which an up call exists. Provision is made for holding the similar relays BU and AU operated by relay BD, so that if the lift is travelling downwards, it can answer landing calls for a downward direction, ignoring up-landing calls until the farthest down landing for which a call exists, is reached.

When the lift comes to the end of the calls, whether made from the car or from the landings, in any one particular direction, then any of the relays in the co-ordinating group which would tend to cause it to drive in the same direction are once more energized. Thus if relays AC and AU were released during a particular traverse then relay AU would be re-operated first, since up landing calls and car calls only would be attended to. On leaving the last landing from which an up call has been stored, relay AU is therefore energized and on delivering the passenger from this landing relay AC is also operated once more. Contacts of these two relays now enable either or both of the relays AD and BD to be released, this enabling the lift to answer down calls.

It is now necessary to consider the manner in which the direction relays DR are moved from one position to another. This must only occur when the lift has reached the extremity of its travel in answering calls for one particular direction. All the direction relays DR C, D and U are connected in parallel, the two operating leads being taken to terminals 2 and 3 respectively in each of the Figures 2, 3 and 4. The relay $C-DR$ is shown in Figure 2 in a position corresponding to downward travel of the lift. If positive potential is applied to lead 17—2, the relay operates to an "up" position, and locks itself energized in this position by its contact $C-dr_1$. The two coils respectively connected to terminal 2 and to this contact $C-dr_1$ are wound in such a direction that the magnetism produced on the core of the relay is in the same direction. The relay thus stays in this position no matter whether a positive is applied to terminal 2 or not. When the relays DR operate to an "up" position, contact $dr_2$ (C, D and U) change over. A positive applied to lead 17—3 now energizes the third coil of the relays DR in such a manner as to neutralize the magnetism produced by the position from contacts $dr_1$, and the relays release to a down position. In this position positive applied to both leads 17—3 and 17—2 causes no energization of the core because the positive on lead 17—3 short-circuits the left hand (first) coil 300 of the relays DR, so that the relay contacts remain in a down position having once attained this, until an up energizing condition alone exists.

A similar effect follows if the relays DR are energized from terminals 2 and 3 with the relay contacts in upward position i. e. with all the contacts $dr_1$ closed, since although the positive derived from terminal 3 flows through the third coil of the relay and energizes the core in a direction opposite from that produced by current in the second coil, the positive applied over lead 17—2 to terminals 2 still energizes the first coil sufficiently to hold the relay operated.

These positives on terminals 2 and 3 are derived from terminals 18 and 42 in Figure 1 via contacts $C-r_5$ and $D-r_5$ in Figures 2 and 3 respectively. As will be seen later these contacts $C-r_5$ and $D-r_5$ are open the whole of the time the lift is actually in motion, so that the relays DR cannot be moved until the lift actually stops. Consider the contacts connected to terminal 18 (Figure 1), these energize the DR relays through lead 17—2 so as to move them to an up position under suitable circumstances enumerated in the foregoing. Contact $ps_4$ is open whilst the lift is slowing down and for a short period thereafter so that the direction of relays (DR) cannot be moved for this period, and contact $ac_3$ is closed when a car call for an upward direction is made. As stated, this type of call can only be made either when the lift has just previously been travelling in an upward direction or when no calls exist for the lift, so that the direction of relays must under these conditions be held in or reversed to an upward direction. Other contacts $ad_3$ and $au_3$ signifying that calls exist above the lift for a downward or upward direction, are rendered ineffective to reverse the downward position of the direction relays if the lift has previously travelled in a downward direction, and a call below it exists. This is performed by means of contact $bc_4$ which is opened if a call for a landing below the lift's position is made from the car. Thus all the necessary conditions regarding reversal into an upward direction are met.

A similar terminal group is connected to contact 42 which through lead 42 and 17—3 operates the direction relays into a downward position. As before, $ps_3$ prevents any operation of the relays whilst the lift is slowing down and for a period thereafter. Similarly, contact $bc_3$ reverses the relays immediately since it is closed by a car call having a first order of priority. Finally contacts $bu_3$ and $bd_3$ are prevented from reversing the relays if an up car call is made, by the contact $ac_4$.

It is now necessary to consider the means adopted to cancel calls stored on either of the storage groups. This storage, as previously described, takes place as regards the car call relay group by means of push button CA—CD situated in the lift car, and operating directly on the storage relays. The remaining calls i. e. those made from landings are rendered effective by means of the push buttons DB—DD situated on the second, third and fourth floors respectively and signalling down calls, and also from the pushes UA, UB and UC situated at the first, second and third floors respectively the depression of which signifies an up call. For obvious reasons no down button is provided at the first floor and no up button at the fourth floor. Calls are cancelled from the car call apparatus group in Figure 2 whenever the lift stops at the floor corresponding to the relay operated. This is because a passenger in the car, and wishing to alight at a particular floor at which the lift stops cannot have been at that floor previously, nor can he wish to pass it, so that it is always assumed that the passenger alights. The method of call cancelling in Figures 1 and 1A has been described in the specification of British patent specification appln. No. 19919/35.

Conditions for cancelling in the other relay groups are however not quite so straightforward. If a down call for example is stored, and the lift passes the floor at which storage takes place whilst travelling in an upward direction, then even though the lift stops at the said floor the call must not be cancelled, and the lift must return and stop at this floor after travelling to the farthest up call stored. Similar conditions exist in connection with up stored calls. These conditions are met by the contacts $au_4$, $bu_4$, $ad_4$ and $bd_4$. The method of operation of the relays AU, BU, AD and BD has already been described and it will therefore be seen that cancellation of a call cannot take place by closure of one of these contacts if the lift is moving in a direction unsuitable for answering a call. Thus if a down call exists on floor 2 and the lift moves upwards, even stopping at floor 2, then so long as a call exists above the lift, neither relay AD or BD can be released, so that neither contact $ad_4$ nor $bd_4$ can apply positive to lead 41, and the down call is not cancelled from the storage group concerned. Similarly if the lift passes an up stored call whilst going downwards and having further down calls ahead of it an up stored landing call cannot be cancelled.

If however a landing call is made, and the lift arrives at the landing in the direction required by the call, or having no further calls ahead beyond the floor from which this particular call was made, then none of the relays associated with the cancelling leads 40 or 41 are in such a position as to prevent a cancellation i. e. if positive potential is applied to the proper one of these two leads.

Reference should here be made to the function of relay E and its contacts $e_1$ and $e_2$. This relay is for the purpose of cancelling a call on a landing to which the lift has been brought, when no further calls exist in either direction. Under these conditions none of the contacts $ac_5$—$bu_5$ are closed with the result that relay E releases. Contact $e_1$ or $e_2$ then applies positive to the lead suitable for releasing the call relay in either of the up or down landing groups which brought the lift to the particular position to which it is situated.

In order to ensure that the lift stops with certainty at the lowest and highest floors limit switches LU and LD, Figure 5, are provided. When the lift nears one of these terminal floors one or the other of these contacts opens. Suppose, for example, the lift reaches the lowest floor served, the switch LD is opened by the passage of the lift and removes positive potential from lead 21. This removes a short circuit from relay DL which operates. The contact $dl_1$ of this relay is connected to lead 39, contact D—$dr_3$ of the D—DR relay in the down landing call group, and thence to negative potential at terminal 7, Figure 3. Since the lift is travelling downwards this negative potential is applied through the said D—DR contact D—$dr_3$ and $dl_1$ to relay SP, which if not already operated, it is at once energized. This as will be seen later stops the lift at the terminal floor. Other safeguards are also provided, but as these are of known type and do not form part of the present invention they are omitted. On arrival at the terminal floor, if any other calls are present in the lift, the relays DR are reversed as previously described, and its contact D—$dr_3$ removes negative potential from lead 39 so that although contact $dl_1$ is still closed relay SP is enabled to release and the lift starts in the opposite direction from that in which it was previously travelling. A precisely similar condition exists as regards the top landing.

So far no indication has yet been given as to the manner in which the switches W in the various apparatus units are kept in step with the lift's motion. These switches each possess an up drive magnet WA (C, D and U) and a down drive magnet WB (C, D and U), and these magnets receive impulses from the contacts $z_1$, $z_2$ or $z_3$ over leads 19, 36 or 37. Taking the switch C—WA in Figure 2 as being entirely typical, every time the lift passes a zone plate these plates being situated approximately half-way between each floor, an inductor relay ZR momentarily closes its contact, operating relay Z which closes contacts $z_1$, $z_2$, $z_3$. This momentary closure of contact $z_1$, $z_2$ and $z_3$ applies positive potential via all the contacts $r_4$ (closed since the lift is in motion) through contacts $t_1$, and all contacts $dr_4$ which are in a position corresponding to the direction of travel of the lift, to whichever of the magnets WA or WB are the ones which impulse the switches in a suitable direction. Thus for each floor passed, the switches W receive a step and move the wipers one contact in the direction of motion of the lift. Thus all the switches are impulsed in a precisely similar manner.

In order to ensure that complete synchronism between the switch movements and lift movements is ensured, further connections are also taken from the limit switches LU and LD (Figure 5) through leads and terminals 20, 21 to relays T (C, D and U). When the switches W stand at any floor other than a terminal, positive from wipers W3 (C, D and U) is applied to both coils of the relays T. The negative potential from the resistances connected to the relays T are prevented from operating it by the limit switches which short circuit both resistances. If however the lift reaches a limit switch whilst the wipers W3 stand on a contact connected to the relays T, a short circuit is removed from one of the coils and that relay T operates. Its contact $t_1$ (C, D or U) interrupts the normal stepping circuit and $t_2$ (C, D or U) completes a rapid stepping circuit via the corresponding self-interrupting contacts $wa$, $wb$ through the corresponding contact $dr_4$ to whichever magnet WA or WB drives the switch in the proper direction to enable it to catch up with the movement of the lift. The switch is thus synchronized whenever the lift reaches a terminal floor.

In order to ensure that the lift is stopped at the correct floor i. e. one for which a car call has been made, or one having a stored floor call for the direction of travel in which the lift is proceeding, a switch bank W4 is provided on each storage group. Taking that in Figure 2 first, it will be seen that when the lift reaches a point one-and-a-half floors away from the point at which stoppage is required, one of the wipers of C—W4 is standing on a contact connected to a relay contact operated by a storage relay for the said floor. Thus for example the switch wiper is shown as standing in a position corresponding to the third floor. If a down call is made by the operation of relay C—A in this figure, then when the lift has moved half-a-floor away from its present position the switch is stepped by operation of relay Z so that positive from the wiper C—W4 is applied through contact C—$a_5$ to contact C—$dr_6$ which is in the position shown since the lift is travelling downwards and thence via lead 29 to one coil of relay PS. When relay Z releases relay PS operates from negative at contact $z_4$. At this time since the lift is not standing at a floor relay SR has opened its contact, relay S is released, and therefore contact $s_2$ is closed. Operation of relay PS indicates that a "prepare to stop" condition exists.

The lift now commences to slow down under the effect of retarding means not shown, and half-a-floor ahead of the required floor relay Z operates once more, and its contact $z_4$ applies negative via contact $ps_2$ to one coil of relay SP, the stop relay, which operates and locks itself in this position to contact $sp_1$. Meanwhile PS has locked itself operated through contacts $ps_1$ and $dy_1$ to positive on lead 33, this positive being applied by contact $g_1$ Figure 5 (see later). Relay DY is already operated over lead 25 by positive applied from contact C—$r_6$ which is closed whenever the lift is moved. The lift continues to decelerate all the while until it reaches a point just prior to the floor at which stoppage is required. Inductor relay SR then operates and releases relay S, and its contact $s_1$ in closing applies positive through contact $sp_2$ to lead 15 and thence to all the coils of the relays R. This short circuits these relays and they all release, the contact C—$r_1$, the controlling contact, removing negative potential from whichever of the contactors UD or DD has been previously operated. Other stopping conditions are however available besides those provided in connection with car calls. Thus for example any landing call which is ahead of the lift and for the same direction of travel should be capable of stopping the lift, though a call ahead of it for an opposite direction of travel should not so interrupt its travel. These conditions are provided by means of the banks D—W4 and U—W4 and the associated contacts found in Figures 3 and 4. Taking the case of Figure 3 for down landing calls it will be seen that although terminals 30, 31 and 32 are connected together as on Figure 2, contacts 26, 27 and 28 are not so connected. Thus if the lift is above a landing call for a downward direction, conditions for stopping the lift are identical with those described in connection with car calls, Figure 2. If however the lift is above an up floor call registered on Figure 4, for example if it stands as shown on this figure at the third floor and an up call is made from the first floor, contact U—$a_5$ closes a path from a contact in the bank of U—W4, but since the wiper U—W4 is not standing on this contact no path is completed for stopping the lift until it has reached the lowest floor.

Another condition exists in connection with the down stored calls. Suppose down calls exist from a number of floors and the lift is below and moving upward to answer the calls it must not stop at the first down call encountered and answer it, as this would result in a number of unnecessary reversals. Thus if the lift is standing at the lowest floor and down calls exist at floors 2, 3 and 4, all the contacts D—$b_6$, D—$c_6$ and D—$d_5$ in Figure 3 are operated. Although a circuit now exists through contact D—$dr_6$ (operated to the left and up position) to contact D—$d_5$, yet no positive is fed from wiper D—W4 to lead 29 to stop the lift until its wiper stands on a contact connected to contact D—$d_5$ i. e. the wipers of switch D—W and therefore the lift passes all the down stored calls until the uppermost one (from floor 4) is reached. As each down call is now to be cancelled as the lift stops at the floor which it is made, the lift picks up the top down call, releases relay D—D, then picks up the one at the third floor, the stopping circuit being from positive on wiper D—W4 through D—$c_5$, connected contacts 30, 31 and 32 to contact D—$dr_6$, which is now as shown in a down position, and thence via terminal 29 to terminal 24, contact D—$dr_5$ and terminal 22 to lead 34 and contact $bd_6$ (Figure 1) which is now closed, to operate relay PS.

Similar conditions exist in Figure 4, the up panel where contacts 26, 27 and 28 are strapped together while contacts 30, 31 and 32 are not so treated. Here if a lift is near to the top of its travel and up calls exist below it, it travels down to the lowest of these calls before reversing, in a manner similar to that described in connection with down calls above the lift. In this case positive is applied via contact U—$dr_6$, Figure 4 and terminal 29, lead 24, terminal 24 on Figure 2, contact C—$dr_5$, terminal 22, lead 22, terminal 22 on Figure 1 to operate the relay PS via contact $bu_6$.

A short delay is given to the user to open the lift gate when the lift arrives at the floor to which it has been called. Upon arrival, relay SP remains operated via contact $ps_2$, and relay PS remains operated through contacts $ps_1$ and $dy_1$ to positive supplied to lead 33 by contact $g_1$. This latter contact is held closed when all the landing gates and the lift car gate are closed (see later), thus when any gate is opened this holding circuit for PS is broken by $g_1$ and both this and the relay SP are released. If, however, the lift user changes his mind, or fails to enter or leave the lift for some other reason, then when the lift ceases to move and the relays R release, contact C—$r_6$ over lead 25 removes positive from relay DY. This relay however is connected to a condenser CL which is charged by the potential derived from contact $r_6$. When this potential is removed, the condenser discharges slowly through the relay DY which is held operated for several seconds. This allows the passenger time to open and close the door and the lift is not re-started until the latter has occurred, or the relay DY has operated, whichever is the sooner. When relay DY releases, its contact $dy_1$ releases PS and thence SP, and the lift is once more ready to move if none of the gates are open.

Turning now to Figure 5, it will be seen that the power and lift shaft equipment of the lift comprises a motor having a stator ST and a rotor RO the latter driving the lift car LC in the shaft by means of the flexible cables and counterweight. A brake BK is normally applied by means of a spring to the rotor shaft and is removed on energization of the stator. This latter is produced by operation of either one or the other of the contactors UD or DD, these driving the lift in an upward or downward direction respectively. These relays are both energized in series with contacts of each other thus providing an electrical inter-locking so that both can never be operated at any one time, and also in series with the limit switches LU and LD. Negative potential for energization is derived over leads 5 and 6 connected to terminals 5 and 6, Figure 2, from contacts C—$dr_3$ and C—$r_1$. Contact C—$r_1$ on Figure 2 is closed only when the lift is intended to travel and is opened when the lift is intended to stop. Means whereby this is performed have already been described. Contact C—$dr_3$ determines in which direction the lift is to run and hence which contactor has to be energized.

In addition to the foregoing a gate lock relay G is provided. This relay has contacts ($g_2$, $g_3$) in series with each of the contactors UD and DD, so that these can only be operated when all the gate locking contacts LA—LL are closed. If any of the gates should be opened either at a floor or during lift travel the contactors are then both de-energized and the lift is brought to rest, and cannot be re-started until all the gates are once more closed. Contactor $g_1$ also functions in the manner previously described to remove the stopping condition from the co-ordinating apparatus and closure of all the gates results in operation of relay G enabling one or other of the contactors UD, DD to be operated from the apparatus in Figure 2 if further calls exist for the lift to answer.

It is now proposed to further illustrate the system by the description of certain typical cases. These cases are not by any means exhaustive of the possibilities of the system, but are given merely to show in what manner the lift deals with various conditions. A very large number of conditions are catered for by the arrangements shown, means whereby this is effected having already been described. It should be remembered that all the relays DR (C, D and U) are moved simultaneously, all the relays R (C, D and U) are connected in parallel and all the switches W (C, D and U) step together by relay L operating contacts $z_1$, $z_2$, $z_3$. Other actions in the apparatus groups of Figures 2, 3 and 4 are independent of each other.

*Case 1.—Lift at 1st floor, up calls at second and third floors*

Assuming the lift is standing at floor 1 and no calls are present in the system, then all the relays AC, BC, AD, BD, AU, BU and S are operated, and the switches W (C, D and U) are standing with their wipers on the first contacts in each row i. e. the equivalents to the contacts connected, for example, to one coil of the relay C (C, D and U). The relays DR are all standing with their contacts in the positions shown i. e. representing a downward direction of travel, since this is the last direction in which the lift has travelled. The push buttons UB and UC (Figure 4) representing up landing calls are now depressed, operating relays U—B and U—C in this figure.

U—$b_1$ and U—$c_1$ lock relays U—B and U—C operated.

U—$b_2$, U—$b_3$, U—$c_2$ and U—$c_3$ remove positive potential derived from wiper U—W1 from terminal 1 and lead 46, thus removing positive from terminal 46 relay AU Figure 1 and allowing this relay to release.

U—$b_4$ and U—$c_4$ prepare to operate the relays R.

U—$b_6$ and U—$c_6$ prepare stopping circuits for the lift, to be employed later.

$au_1$ and $au_2$ (Figure 1A) prevent the release of relays AD and BD if down calls are put in before the lift has finished answering the up calls.

$au_3$ applies positive via contacts $bc_4$, $ps_4$, terminals and lead 18, contact C—$r_5$ lead 17—2 and terminals 2 to one (the left) coil of all the relays DR operating them to an up position.

$au_4$ applies positive to lead 40 in preparation for cancelling the calls as the lift reaches the associated floors.

$au_5$ operates relay E.

$au_6$ prepares a stopping circuit from lead 23 $dr_1$ for each relay DR locks the corresponding relay operated in an up position.

$dr_2$ for all relays DR prepares a circuit for operating the respective relays to a down position.

C—$dr_3$ on Figure 2 only prepares to energize the up drive contactor UD over lead 5 (Figure 2).

$dr_4$ on Figures 2A, 3A and 4A, changes over the impulsing circuit to the up drive magnets WA (C, D and U) of the switches W.

C—$dr_5$ on Figure 2A, changes over the lead from terminal 24 to terminal 23 for stopping purposes in connection with contact $au_6$.

U—$dr_6$ prepares a path for positive from U—W4 to be applied to terminal 29 and lead 24 for stopping.

$e_1$ and $e_2$ (Figure 1A) remove positive potentials from leads 40 and 41, thus preventing call cancellation so long as no other calls exist for the lift.

$e_3$ removes a short circuit from all relays R applied over lead 15 so that these relays now operate.

C—$r_1$ (Figure 2) applies negative from terminal 7 via contact C—$dr_3$, in left position, which operates through lead 5 the up drive contactor UD.

U—$r_2$ breaks a circuit from terminal 13 for positive potential over lead 40 used for call cancellation later.

$r_4$ (C, D and U) completes the impulsing circuits from $z_1$, $z_2$, $z_3$, through leads 19, 36, 37, the respective contacts $dr_4$ in up positions to the several switch driving magnets WA (C, D and U).

C—$r_5$, Figure 2A through leads 18 and 17—2 prevents any further energization of the relays DR on the first coil.

C—$r_6$ operates relay DY over terminal and lead 25.

$ud_1$ Figure 5 prevents false operation of contactor DD.

$ud_2$ and $ud_3$ apply potential to the stator of the driving motor in a direction suitable for driving it upwards. Brake BK is also energized at the same time and its coil removes the brake shoe from the drum.

The foregoing is of course assuming that all the gates are shut, in which case relay G is operated.

The lift now drives off, accelerating in an upward direction until just after leaving the floor at which it was positioned, it leaves the levelling inductor plate, operating relay SR. This relay then releases relay S which releases its contacts, and at the same time positive is applied from wiper U—W4 Figure 4A through contact $b_6$, connected terminals 28, 27 and 26, contact U—$dr_6$, (in left position) terminal 29, lead 24 to terminal 24, Figure 2, thence via contact C—$dr_5$ in right position and terminal 23, lead 23 through contacts $au_6$ and $s_2$, both now closed, to operate relay PS to negative at contact $z_4$.

$ps_1$ locks relay PS operated to positive on contact $dy_1$, this being derived from terminal 33 over lead 33 from contact $g_1$ Figure 5.

$ps_2$ prepares to operate relay SP.

$ps_3$ and $ps_4$ opening interrupt the supply of any potentials over leads 18, 17—2 or lead 42—17—3 derived from the associated relay contacts, for energizing the several relays DR (C, D and U), this preventing these relays from being moved until the lift has reached a floor.

The lift continues to drive until it reaches a point half-way between the first and second floors, when inductor relay ZR is momentarily operated by a zone plate. This operates relay Z momentarily. Contacts $z_1$, $z_2$ and $z_3$ apply positive potentials to terminals 19, 36 and 37 respectively, these potentials being applied through leads 19, 36 and 37 to terminals 19 on Figures 2A, 3A and 4A respectively and to the contacts C—$r_4$ and C—$dr_4$, D—$r_4$ and D—$dr_4$, U—$r_4$ and U—$dr_4$ respectively and to the up drive magnets WA (C, D and U).

$z_4$ swinging to right operates relay SP via contact $ps_2$, $sp_2$ closing puts positive potential from contact $s_1$, now closed, through lead 15 to short circuit the several relays R which release the contacts $r_3$ (C, D and U) which by closing supply positive to lead 14 so that $s_1$ can open.

$sp_1$ through $ps_2$ locks relay SP operated.

The lift now commences to slow down by means (not shown) approaching floor 2 at which a call has been made. On reaching a point a little ahead of the floor the inductor relay SR is operated, closing its contact and energizing relay S so that contacts $s_1$ and $s_2$ open and remain open while the car is at a floor.

C—$r_1$ opening removes negative potential from the contactor UD, which releases and allows the lift carriage to stop.

U—$r_2$ applies positive from contact 13, Figure 4 derived through lead 40 from contact $au_4$ Figure 1 to one coil of relay U—A Figure 4. The other coil of this relay being energized in an opposite direction, causes the core of the relay to become demagnetized and it releases, thus cancelling the call.

$r_3$ (C, D and U) by applying positive to lead 14, then through contact $sp_2$ and lead 15, prevents premature operation of the relays R.

C—$r_5$ closing prepares a path for further energization of the several relays DR if necessary.

C—$r_6$ opening removes positive over lead 25 from relay DY but the latter being connected in parallel with the condenser CL does not yet release.

When the gate is opened by the passenger entering the lift car contact $g_1$ operating through lead 33 removes positive from the locking coil PS which releases. Its contact $ps_2$ now releases relay SP and the lift is ready for further travel. Assuming that the passenger depresses button CD (Figure 2) intimating that he wishes to travel to the 4th floor, relay C—D is operated and its contacts perform functions similar to those already described in connection with relays U—B and U—C. Reverting to the opening of the gate, release of relay SP opens contact $sp_2$ and removes the short circuit applied over lead 14 to the relays R by the contacts $r_3$. These relays R operate in each of the control groups C, D and U, but the contact C—$r_1$ (Figure 2) cannot yet energize a driving contactor because the gate relay G has opened its contacts $g_2$ and $g_3$ thus preventing such energization. When the gate is once more closed and relay G again operated, the up drive conductor UD is energized, and the lift starts off once more in an upward direction.

Immediately after leaving floor 2 relay PS is operated as previously described, and on passing the zone plate between floors 2 and 3 the several switches W are each stepped further once more in an upward direction and relay SP is operated. Finally, contact $s_1$ stops the lift at floor 3 and the intending passenger enters. Since his is an upward call he can only wish to travel to the 4th floor (same as above) so he also depresses button CD Figure 2, though as relay C—D in this figure is already operated it has no effect. In the meantime, operation of relay C—D has removed positive potential from lead 1 and from relay AC, which releases, its contacts $ac_1$ and $ac_2$ holding relays AD and BD operated as described in connection with relay AU. After cancellation of the call made from floor 3 by arrival of the lift at this floor, positive is restored by the contacts of relays U—B and U—C in Figure 4 (U—$d_2$ and U—$d_3$ closed) to lead 1 of that figure, and thence by lead 46 to relay AU, which re-operates. The functions of this relay (A—U) are however now practically duplicated by the released relay AC, so that on closure of the lift gate the car moves off to its final destination. Its arrival at floor 4 follows the lines previously outlined for the two previous floors except that upon arrival the cancellation of a car call stored on relay C—D (Figure 2) takes place when relay C—R operates and contact C—$r_2$ falls, and contacts C—$d_2$ and C—$d_3$ once more apply positive to terminal 1, so that through line 1 relay AC is re-operated. Relay PS and hence SP is released by opening of the lift gate, and all apparatus now occupies a position similar to that shown in the drawings except that all wipers of the switches W (C, D and U) are moved to positions one contact to the left of the positions shown, that is floor 4 and the relays DR all have their contacts moved into positions opposite to those shown indicating an upward direction of travel. Since no other calls are available for the lift to answer, it remains stationary with relay G operated by the final closure of the lift gates.

*Case 2.—Lift at top of shaft (floor 4), down call at floor 2 and up call at floor 3*

When the call is made at floor 2 for a downward direction, push button DB (Figure 3) is depressed momentarily, operating relay D—B in this figure.

D—$b_2$ and D—$b_3$ remove positive applied from wiper D—W1 to terminal 8 and through lead 44 to terminal 44, so that relay BD (Figure 1) releases.

The other contacts of this relay BD perform functions similar to those previously described for AC, that is:

$bd_1$ and $bd_2$ prevent release of relays AU and BU in response to any up calls made later.

$bd_3$ applies positive through contacts $ac_4$ and $ps_3$ to lead 42, thence via terminal 18 and contact D—$r_5$ (Figure 3A) to terminal 17 (Figure 3A) and to the contact $dr_2$, connected to all the terminals 3 in the apparatus groups (Figures 2, 3 and 4). This potential applied through the contacts $dr_2$, still in their up position at the left causes current to flow through the third coil of each of the relays DR in opposite direction from the current flowing through the second coils from the several contacts $dr_1$ so that the relays DR all release and their contacts $dr_1$, $dr_2$, etc. take up positions corresponding to a down drive direction (as shown on Figures 2, 3 and 4).

$bd_4$ prepares to cancel the call on floor 2.

$bd_5$ operates relay E.

$bd_6$ prepares a stopping path for relays PS on approaching floor 2.

$e_3$ through the terminals and lead 15 removes a short circuit from all the R relays allowing them to operate from negative derived from the resistances connected to contact D—$b_4$ in Figure 3.

Contact C—$r_1$ now applies negative (Figure 2) through contact C—$dr_3$ to lead 6 and thence to the down drive contactor DD (Figure 5) which in operating removes the brake from the lift and causes the stator to be energized in a direction for driving the lift downwards. On passing a point midway between the top and third floors, the inductor relay ZR is momentarily operated resulting in the operation of relay Z and impulsing of the driving magnets WB of all the switches W, thus moving their wipers on to the contacts corresponding to the third floor. The wiper D—W4 (Figure 3) is now standing on a contact connected to the operated contact D—$b_5$ of this figure and positive is applied through this contact D—$b_5$, left position, terminals 31, 32 and contact D—$dr_6$ to terminal 29, thence via terminal 24 (Figure 3) and contact D—$dr_5$ to terminal 22, lead 34 to terminal 34 (Figure 1) and through the operated contacts $bd_6$ and $s_2$ in readiness to operate PS when the relay Z releases. The lift now commences to slow down gradually, the operation of relay S at the third floor in passing producing no effect. When the inductor plate midway between the third and second floors is passed relay Z is operated and the switches W (C, D and U) are stepped once more in a downward direction, and contact $z_4$ operates relay SP as previously described.

When the lift reaches the second floor operation of the inductor relay S—R opens its contact, thus releasing relay S which applies positive from contact $s_1$ (closed) to contact $sp_2$ and lead 15, thereby short circuiting all the relays R which release. The circuit of the driving contactor DD is opened by the opening of C—$r_1$ and release of the contactor stops the lift. Cancellation of the floor 2 call now takes place as previously described.

When the passenger in entering the lift opens the lift gate and releases relay G, contact $g_1$ (Figure 5) operating through lead 33 to terminal 33 (Figure 1) releases relay PS. Relay SP though de-energized, is slow to release and does not fall immediately. In the meantime the passenger enters the lift car and thereby closes the floor switch PS which holds relay SP operated (contacts $ac_6$ and $bc_6$ being closed) and the contact $sp_2$ maintains a short circuit applied to the relays R by contact $s_1$. Thus when the gate is closed, although contacts $g_2$ and $g_3$ remake the circuits of the driving contactors the lift does not now reverse and drive off to collect the call above the lift because there is a passenger in the car wishing to proceed in the same direction (down) as the lift has previously travelled. On entering the lift the passenger depresses button CA, operating the car call storage relay C—A (Figure 2), and its contacts $a_3$ and $a_1$ remove positive from terminal 8 and hence from relay BC. This relay (BC) in operating prevents relays AU and BU from releasing by its contacts $bc_1$ and $bc_2$, so that the lift does not yet reverse its direction of travel. Contact $bc_6$ now releases relay SP and the opening of contact $sp_2$ allows the relays R to operate, this time from negative potential derived from C—$a_4$ Figure 2. The lift now continues to run in a downward direction, all operations being as previously described, until floor 1 is reached when the lift stops. The opening of the gate at this floor operates contact $g_1$ and releases relays PS and SP, and the cancellation of the call stored on relay C—A Figure 2 applies positive once more to lead 8 and releases relay BC. Since a call is stored for an upward direction at floor 3, the relay U—C connected to the push button UC in Figure 4 is operated. Its contacts U—$c_2$ and U—$c_3$ therefore interrupt positive from wiper U—W1 in this figure through terminal 1 and lead 46 to relay AU (Figure 1A), which operates.

$au_1$ and $au_2$ prevent any down calls from releasing relays AD or BD.

$au_3$ applies positive to lead 18 and thence via contact C—$r_5$ and terminal 17 (Figure 2A) thence by lead 17—2 to all terminals 2, this potential operating all the relays DR to a position corresponding to an upward direction of drive.

$au_4$ applies positive to terminal 40 and thence by lead 40 to terminal 13 Figure 4 in preparation for cancelling the up call at the third floor later.

$au_5$ operates relay E.

$au_6$ prepares a path for operating relay PS.

Since all the R relays are now operated by contact C—$c_4$ (Figure 4A), the lift starts to drive in an upward direction, the contactor UD being energized from contact C—$dr_3$ and C—$r_1$, in Figure 2. The switches C—W, D—W and U—W are impulsed in an upward direction as previously described by contacts $z_1$, $z_2$ and $z_3$ at points midway between 1st and 2nd, and 2nd and 3rd floors, relay PS being operated between the 1st and 2nd floors whilst relay SP is operated between the second and third floors. The lift slows down on approaching the third floor and is stopped there by the operation of relay S. The passenger at this floor now enters the lift, opening the gates and releasing relay PS, although relay SP is now held operated by floor switch contact FS until the passenger pushes the button CD intimating that he wishes the lift to travel upwards to the fourth floor. Depression of this push button operates relay C—D (Figure 2) and its contacts C—$d_2$ and C—$d_3$ by removing positive from lead 1 and releasing relay AC allows contact $ac_6$ to release relay SP. Contact $sp_2$ removes a short circuit from the R relays which once more operate and the lift drives off upwards to the top floor.

*Case 3.—Lift stationary at floor 1 having previously travelled downwards and calls for up and down directions at floor 2*

According to condition 1, the lift should stop at floor 2, pick up the up call, deliver this call, and return for the down call, by this means avoiding more than one reversal. This is accomplished as follows—

The down call from floor 2 is made for example by operation of push button DB slightly before the up call, intimating that the lift is required at floor 2 to answer a down call. Since the lift is at floor 1, operation of the relay D—B (Figure 3) by this push button opens a circuit from positive on wiper C—W1 via contacts D—$b_2$ and D—$b_3$ and terminal 1 (Figure 3) through lead 45 to relay AD (Figure 1), so that this relay releases.

$ad_3$ applies positive to terminal 18 and thence by lead 18 and via contact C—$r_5$ and terminal 17 (Figure 2) and lead 17—2 to the up coils of the relays DR. The DR relay contacts are then moved to an up position.

$ad_4$ applies positive to lead 41 for the purpose of cancelling the down call later.

$ad_5$ operates relay E.

$ad_6$ prepares a stopping path for relays PS later.

Relay D—R in Figure 3 is now operated by a contact of the storage relay D—B in that figure in consequence of the removal of the short circuit previously applied by the contact $e_3$. The lift commences to travel in an upward direction from floor 1 to floor 2. In the meantime, an up call is made from the same floor by depression of push button UB (Figure 4). This operates relay U—B in Figure 4, and the contacts U—$b_2$ and U—$b_3$ of this relay remove positive from terminal 1, allowing relay AU Figure 1 to release.

$au_1$ re-operates relay AD, preventing cancellation of the down call at floor 2 by opening contact $ad_4$.

$au_4$ applies positive potential to lead 40 in preparation for cancelling the up call from floor 2.

On arrival at this floor, the lift stops in a manner similar to that previously described, and the up call is cancelled by positive applied over lead 40 to terminal 13 and wiper U—W2 to relay U—B (Figure 4). As no positive exists on lead 41 to terminal 13 on Figure 3 the relay D—B in Figure 3 representing a down stored call from floor 2 is not at this moment released. A stopping circuit for PS is however derived from contact $au_6$, lead 23 terminal 23 Figure 2A, lead 24 to terminal 29 Figure 4. The passenger now enters the lift, opening the gates, and stores a call for, say, floor 3. The lift proceeds in an upward direction, since the relays DR cannot be reversed, as the only means of performing this reversal is the release of relay AD or BD both of which are held by contacts of relay AC which was released when an up call was made from the lift car. On arrival at floor 3 however relay AC is re-operated. By this time the lift has passed floor 2, so that the contacts D—$b_2$, D—$b_3$ of relay D—B (Figure 3) now remove positive potential from terminal 8 and lead 44 so that relay BD is released, signifying a call below the lift and in a downward direction. Contact $bd_3$ therefore applies positive potential via lead 42 contact D—$r_5$ in Figure 3 to the terminals 3 of all the apparatus groups, this potential sending current through the third windings of the relays DR (C, D and U), causing them to move to a down position. The relays R are thereupon operated by negative potential derived from contact D—$b_4$ (Figure 3), and thence via terminal 15 and contact C—$r_1$ in Figure 2, energizing the down drive contactor DD via contact C—$dr_3$ in this figure. Subsequent operations including stepping of the switches W, stopping at floor 2, concellation of the down call from this floor, and delivery of the passenger at floor 1 are similar to those already described.

These cases are by no means exhaustive and are taken as being typical of the facilities provided by the system in accordance with the present invention. Further examples will be obvious to those skilled in the art, after reading the foregoing description.

I claim:—

1. A system of control for an electrically operated two-buttoned collector lift in which a plurality of similar apparatus groups is employed, each group comprising means for call storage, means for following the motion of the lift in the shaft and means for signalling to a common group of co-ordinating apparatus, characterized in that interconnecting terminal strips in the form of connecting jacks are provided for each group whereby said groups may be easily interchanged or replaced.

2. A system of control for an electrically operated lift of the two-button type in which a plurality of similar apparatus groups is employed, each group comprising means for call storage, means for following the lift's motion in the shaft and means for signalling to a common co-ordinating group, characterized in that each apparatus group is mounted on a single mounting plate comprising terminals which co-operate with a connecting jack on the rack on which the said apparatus groups are mounted such that the said groups are easily interchangeable or replaceable.

3. A system of control for an electrically operated collector lift comprising a control group of coordinating apparatus, a plurality of groups of push button controlled apparatus each push button group comprising call storage means for the respective floors, lift following means for each push button group, relays and circuits for each push button group arranged for cooperation with said control group for control of the lift, said control group including a pair of control relays for each of the respective push button groups for controlling the starting and stopping of the lift upon operation of a push button of one of the respective push button groups, and direction relays in each of said push button groups arranged to be operated by circuits controlled by the respective control relays, the control by the latter being such that said direction relays may be reversed only after response has been made to all calls requiring movement of the lift in the same direction.

4. A system of control for an electrically operated collector lift comprising a control group of coordinating apparatus, a plurality of groups of push button controlled apparatus each push button group comprising call storage means for the respective floors, lift following means for each push button group, relays and circuits for each push button group arranged for cooperating with said control group for control of the lift, said lift following means in each push button group comprising a step-by-step switch, the wipers of which are arranged to be operated in one direction or the other by one or the other of two stepping magnets to follow the lift, said stepping magnets being operated by a relay operated by the lift in passing from floor to floor, each push button group being provided with a direction relay having a movable contact for determining which of the stepping magnets is to be operated according to the direction of travel of the lift, and means for operating the step-by-step switches of the several groups synchronously and in conformity with the position of the lift.

5. A system of control for an electrically operated collector lift comprising a control group of coordinating apparatus, a plurality of groups of push button controlled apparatus each push button group comprising call storage means for the respective floors, lift following means for each push button group, relays and circuits for each push button group arranged for cooperating with said control group for control of the lift, each of said push button groups being provided with a direction relay having movable contacts arranged to be positioned according to the direction of travel of the lift, and circuits controlled by relays in said control group for operation of said direction relay, the direction relays of the several push button groups being arranged in parallel circuit for operation simultaneously.

6. A system of control for an electrically operated collector lift comprising a control group of coordinating apparatus, a plurality of groups of push button controlled apparatus each push button group comprising call storage means for the respective floors, lift following means for each push button group, relays and circuits for each push button group arranged for cooperation with said control group for control of the lift, each push button group being provided with a direction relay and up and down contactors are provided for effecting travel of the lift in one direction or the other, said contactors being arranged to be operated from one of said push button groups by circuits controlled by the direction relay in said group and up and down limit switches in the respective contactor circuits arranged to be operated by the lift respectively in its extreme up and down positions for opening the circuit for energizing the corresponding contactor.

7. A system of control for an electrically operated collector lift comprising a control group of coordinating apparatus, a plurality of groups of push button controlled apparatus each push button group comprising call storage means for the respective floors, lift following means for each push button group, relays and circuits for each push button group arranged for cooperation with said control group for control of the lift, said lift follwing means comprising step-by-step switches having wipers impulsed in synchronism with and to correspond with the floor position of the lift and up and down contactors are provided for effecting travel of the lift in one direction or the other, said contactors being operated by circuits provided with up and down limit switches arranged to be operated respectively by the lift in its extreme up and down positions for opening the circuit, and means controlled by said limit switch circuits and brought into action for impulsing said step-by-step switches to synchronize the wipers of said switches with the floor position of the lift when said limit switches are operated at the extremes of movement of the lift.

8. A system of control for an electrically operated collector lift, comprising a plurality of interchangeably similar push button controlled groups, one push button group being for up calls, one for down calls and one for car calls, each push button group including push buttons and relays for call storage for the respective floors, lift following means including a plurality of wipers and wiper contacts and cooperating relays and circuits and a series of terminals for each push button group to which circuits of the respective groups are connected, a control group of coordinating apparatus comprising relays and circuits including a plurality of pairs of up and down control relays, each pair of the latter relays cooperating with one of said push button groups, and a series of terminals to which the control group circuits are connected, and connections between the terminals of the respective push button groups and said terminals of the control group for interoperation between the respective push button groups and the control group for control of the lift.

9. A system of lift control as in claim 8 wherein the relays of the respective pairs of control relays in the control group are provided with contacts for controlling circuits of other of said control relays so that when one of a pair of control relays has been operated by its push button group the control relays of another pair cannot be operated by the corresponding push button group.

10. A system of lift control as in claim 8 wherein circuit means including contacts of the respective pairs of control relays are provided for cooperation with wipers of the lift following means and the corresponding call storage relays of the respective push button groups for cancelling the calls of a push button group, said circuit means acting in cooperation with said contacts of the pairs of control relays of the control group and said wipers of the following means of the respective push button groups to determine when a call is to be cancelled.

11. A system of lift control as in claim 8 wherein the call storage relays of each push button group are provided with movable contacts arranged in a chain in series circuit between the relays of the corresponding pair of up and down control relays of the control group, the lift following means of each push button group having a wiper and circuits for energizing the relays of the corresponding pair of control relays, said control relays having contacts operated when the respective relays are deenergized for preventing operation of other of said control relays, said control relays being operated by being deenergized upon operation of a call storage relay by the corresponding push button.

12. A system of lift control as in claim 8 wherein a relay for stopping the lift at a floor is provided in the control group and the lift following means of each push button group includes an electrically alive wiper cooperating with circuits corresponding with the floors, said circuits including contacts arranged to be operated by the corresponding call storage relays of the respective floors to establish an operating circuit for operating said stopping relay only when the lift arrives at the floor of an operated call storage relay, electrically alive circuits including contacts operated by the respective control relays in said control group for completing the circuit of the stopping relay for stopping the lift at the floor of a registered call, said relays and contacts being effective to operate the stopping relay only when the call is an end of the run floor call or an intermediate floor call in the direction of travel of the lift.

NORMAN CAROL SMART.